United States Patent [19]

Lebbon

[11] Patent Number: 5,074,034
[45] Date of Patent: Dec. 24, 1991

[54] APPARATUS FOR STAKING END CAPS ONTO A CYLINDRICAL SHELL

[75] Inventor: William C. Lebbon, Rochester, N.Y.

[73] Assignee: Eastman Kodak Company, Rochester, N.Y.

[21] Appl. No.: 696,382

[22] Filed: May 6, 1991

Related U.S. Application Data

[63] Continuation of Ser. No. 622,904, Dec. 6, 1990, abandoned.

[51] Int. Cl.$^5$ .............................. B23P 19/04; B65B 7/28
[52] U.S. Cl. ........................................ 29/806; 29/773; 29/281.4; 53/330; 53/349; 53/353
[58] Field of Search ............... 53/330, 349, 353, 284; 29/731, 773, 806, 281.4, 243.56

[56] References Cited

U.S. PATENT DOCUMENTS

| | | |
|---|---|---|
| 271,304 | 1/1883 | Boldt . |
| 1,310,118 | 7/1919 | Greenfield et al. . |
| 1,955,949 | 4/1928 | Colton ................................ 226/80 |
| 2,339,119 | 1/1944 | Thomas . |
| 2,541,001 | 2/1951 | Vedder . |
| 2,626,581 | 1/1953 | Almgren et al. ................ 53/353 X |
| 2,703,952 | 3/1955 | Perriguey ........................ 53/330 X |
| 2,817,202 | 12/1957 | Lyon ................................. 53/330 |
| 2,940,232 | 6/1960 | Wallace et al. . |
| 3,557,425 | 1/1971 | Scharf ............................... 29/773 X |
| 3,668,824 | 6/1972 | Solomonov et al. .............. 53/330 |
| 3,724,162 | 4/1973 | Lorenzini et al. ............. 53/330 X |
| 3,961,463 | 6/1976 | Dimond et al. . |
| 4,115,913 | 9/1978 | Moriya et al. ................ 29/806 X |
| 4,301,640 | 11/1981 | Haas ............................... 53/330 X |
| 4,656,737 | 4/1987 | Shimizu et al. ................. 29/806 |
| 4,924,419 | 5/1990 | McIntyre et al. ............. 29/806 X |
| 4,974,316 | 12/1990 | Suzuki et al. .................... 29/806 |

Primary Examiner—Horace M. Culver
Attorney, Agent, or Firm—Charles E. Snee

[57] ABSTRACT

An end cap staking apparatus comprises a frame (28) with a slide rail (34) on which a staking mechanism is slidably mounted, the mechanism including a base plate (32) from which a mounting flange (72) extends, a quill shaft (82) supported by the mounting flange, a pivot ring (92) mounted on the free end of the quill shaft, a plurality of elongated staking fingers (102) pivotably supported between their ends around the pivot ring, an outwardly flaring portion (110) on one end of each staking finger, a cam follower (118) on the opposite end of each staking finger, a cam (88) engaged with the cam followers and an actuator (130-158) for the cam to move the flaring portions radially for staking.

14 Claims, 5 Drawing Sheets

APPARATUS FOR STAKING END CAPS ONTO A CYLINDRICAL SHELL

CROSS REFERENCE TO RELATED APPLICATION

This application is a continuation of Ser. No. 622,904 filed Dec. 6, 1990 and now abandoned. This application also is related to the commonly assigned, application Ser. No. 622,985 filed Dec. 6, 1990 by James C. Foote, Jr., Robert F. Allen, Paul E. Bailey, Dean B. Campbell, Thomas A. Cipolla, William G. Hoyt, Robert L. Huseby, Lyndon R. Huttemann, David H. Lancy, William C. Lebbon, Stephen M. Reinke, Thomas E. Stark and Joseph A. Watkins for Apparatus and Method for Forming and Loading a Magazine for Prewound Spools of Web Material.

DESCRIPTION

1. Technical Field

The present invention concerns apparatus for attaching caps to cylindrical containers. More particularly, the invention relates to apparatus for staking metal end caps to cylindrical containers for spools of strip material, such as photographic film.

2. Background Art

A variety of apparatus has been developed for attaching closures to containers, both by deforming the closure radially inwardly into engagement with an exterior surface of the container wall and by deforming the closure radially outwardly into engagement with an interior surface of the container wall. For example, U.S. Pat. No. 271,304 shows an apparatus for capping bottles in which a rotary cam pivots arms radially inwardly into contact with a cap fitted over the mouth of the bottle. U.S. Pat. No. 1,310,118 discloses an apparatus for applying metal rings to the lip of a container in which axial movement of a plunger initially seats the ring on the lip and then causes a plurality of arms to move radially outwardly to prerss the ring against the container. U.S. Pat. No. 1,955,949 discloses another apparatus for capping bottles in which an axially movable cam plate causes a plurality of fingers to move radially outward to stretch a cap for installation on the mouth of the bottle. U.S. Pat. No. 2,339,119 shows an apparatus for capping a bottle in which an axially movable cam causes crimping arms to move radially inwardly to crimp a cap in place. U.S. Pat. No. 2,541,001 shows an apparatus for installing bottle caps in which a rotatable cam plate causes crimping arms to move radially inwardly. U.S. Pat. No. 2,940,232 discloses an apparatus for use with photographic film in which strips of film are wound onto spools, after which the wound spools are inserted axially into previously formed cylindrical magazine shells to which one end cap has already been applied, the shells having axially extending lips through which the leader of the film strip extends in the familiar manner. U.S. Pat. No. 3,668,824 shows a device for securing a valve in the neck of an aerosol container in which radially moving arms press the valve into engagement with the sides of the lip of the container. Commonly assigned U.S. Pat. No. 3,724,162 discloses a mechanism for applying end caps to magazines used for photographic film, in which the caps are picked up by a plurality of radially movable shoes which carry the cap into position on the end edges of the cylindrical magazine shell and then are moved outwardly to stake the cap in place. U.S. Pat. No. 3,961,463 discloses a self releasing capper chuck in which radially movable jaws grip a closure on an inside diameter, move the closure into engagement with a container and then retract to leave the closure in place on the container.

While apparatus of the types described in the preceding paragraph have been used rather extensively over the years, a variety of problems have been encountered. For example, due to a variety of factors, many known apparatus fail to evenly crimp the end cap all around its circumference, which can lead to partially loose caps. For similar reasons, many known apparatus are unable to compensate well for misalignment between the staker mechanism and the container and cap as presented for staking.

SUMMARY OF THE INVENTION

A primary objective of the invention is to provide an improved apparatus for staking end caps to the shell of cylindrical container such as a magazine for photographic film.

Another objective of this invention is to provide such an apparatus which evenly applies staking forces around the end cap.

Still another objective of this invention is to provide such an apparatu which can accomodate significant misalignment between itself and the container and cap to be staked.

Yet another objective of this invention is to provide such an apparatus which is simple in construction, yet robust and durable.

These objectives are given only by way of illustrative examples; thus, other desirable objectives and advantages inherently achieved by the disclosed apparatus and method of the invention may occur or become apparent to those skilled in the art. Nonetheless, the scope of the invention is to be limited only by the appended claims.

A fixture is provided for holding the magazine shell with its end caps already installed, the fixture comprising a through bore aligned with each end cap. A frame is positioned adjacent to the fixture and a slide rail is mounted on the frame and extended essentially parallel to the axis of the magazine shell. At least one, but preferably a pair of end cap staking mechanisms are mounted for reciprocating movement on the slide rail on opposite sides of the fixture. Each such staking mechanism comprises a base plate; a mounting flange attached to the face plate; a quill shaft supported by the mounting flange and extended toward one of the bores in the fixture, the quill shaft having a free end. A pivot ring is mounted on the free end and a plurality of elongated staking fingers are pivotably supported between their ends by and arranged around the pivot ring. An outwardly flaring portion is provided on the end of each staking finger closer to one of the bores in the fixture, the flaring portion being sized to pass through the bore to engage the end cap. A cam follower is mounted to the opposite end of each staking finger and engaged with a cam plate rotatably mounted to the mounting flange. Means are provided for rotating the cam plate to cause the outwardly flaring portions to move radially inward and outward. Finally, the staking mechanisms can be moved toward the fixture until the flared portions extend through the bore in position to engage the end cap and away from the fixture after the end cap has been staked in place.

The cam plate is rotated by a mechanism comprising a spline shaft mounted on the frame essentially parallel to the slide rail. A spline bearing assembly is mounted on the spline shaft for sliding movement along and rotation with the spline shaft. A link is pivotably connected between the spline bearing assembly and the cam plate, whereby rotation of the spline shaft causes the cam plate to rotate to move the staking fingers. To rotate the spline shaft, a crank lever is attached to the spline shaft and a rolling diaphragm pneumatic cylinder assembly having a rod end is pivotably attached to the crank lever. A gimbal mount supports the cylinder. Finally, means cam actuated simultaneously with the means for applying end caps are provided for raising and lowering the cylinder assembly.

DESCRIPTION OF THE PREFERRED EMBODIMENTS

The following is a detailed description of the preferred embodiments of the invention, reference being made to the drawings in which the same reference numerals identify the same elements of structure in each of the several Figures.

Figure 1:
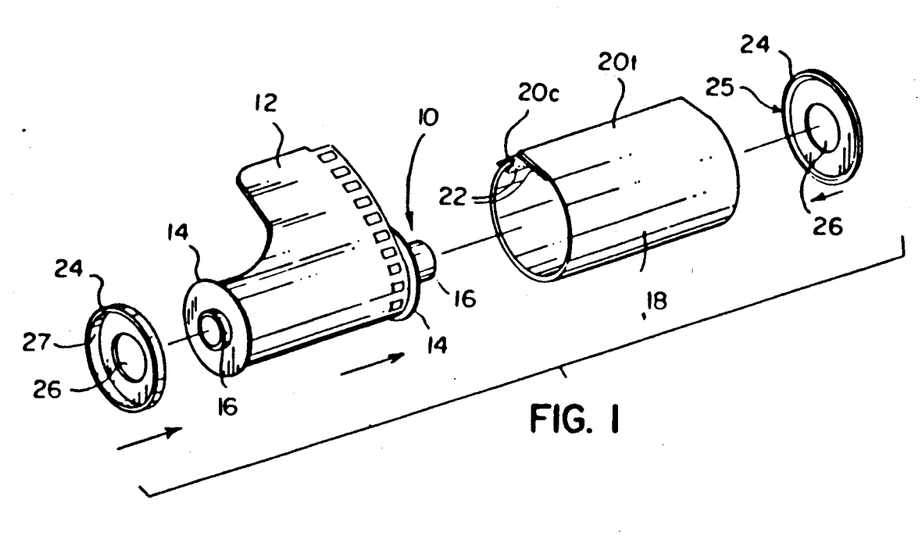
FIG. 1 shows an exploded perspective view of a known type of magazine for photographic film, illustrating one prior art technique for inserting a wound spool axially into the shell of the magazine and applying the end caps.

FIG. 1 illustrates how photographic film magazines have been loaded for many years. A spool 10 has been used which comprises a central core, not illustrated, on which is wound a strip 12 of photographic film. Spool 10 includes a pair of end flanges 14 from which extend hollow axial hubs 16. A preformed metal shell 18 has been used which comprises a pair of axially extending lips 20c,20t between which strip 12 is withdrawn from or wound back into the magazine in use by the consumer. These axially extending lips typically are different in geometry, lip 20c being folded or crimped back on itself and lip 20t being essentially tangent to the cylindrical preformed shell 18. Typically, preformed shell 18 has been formed from a substantially flat rectangular blank, not illustrated, in which lips 20c,20t have previously been formed. To prevent leakage of light into the magazine, lips 20c and 20t have for many years been covered with a lightlock material 22 such as black velvet or plush which firmly but gently engages the surfaces of the film and prevents light leakage into the magazine. The ends of the magazine are closed by a pair of annular end caps 24, each having an aperture 26 for rotatably receiving hubs 16. Such magazines have been assembled by inserting the prewound spool of film axially into preformed shell 18 and then applying and staking end caps 24. Caps 24 are provided with axially and peripherally extending grooves 25 which receive the end edges of shell 18. On the outside surface of caps 24, the walls of groove 25 define an axially and peripherally extending flange 27 whose radially inner surface is deformed outwardly to stake the end cap to shell 18. While this spooling and assembling process is reliable and has been rather widely used, the apparatus for practicing the process tends to be limited in speed.

Figure 2:
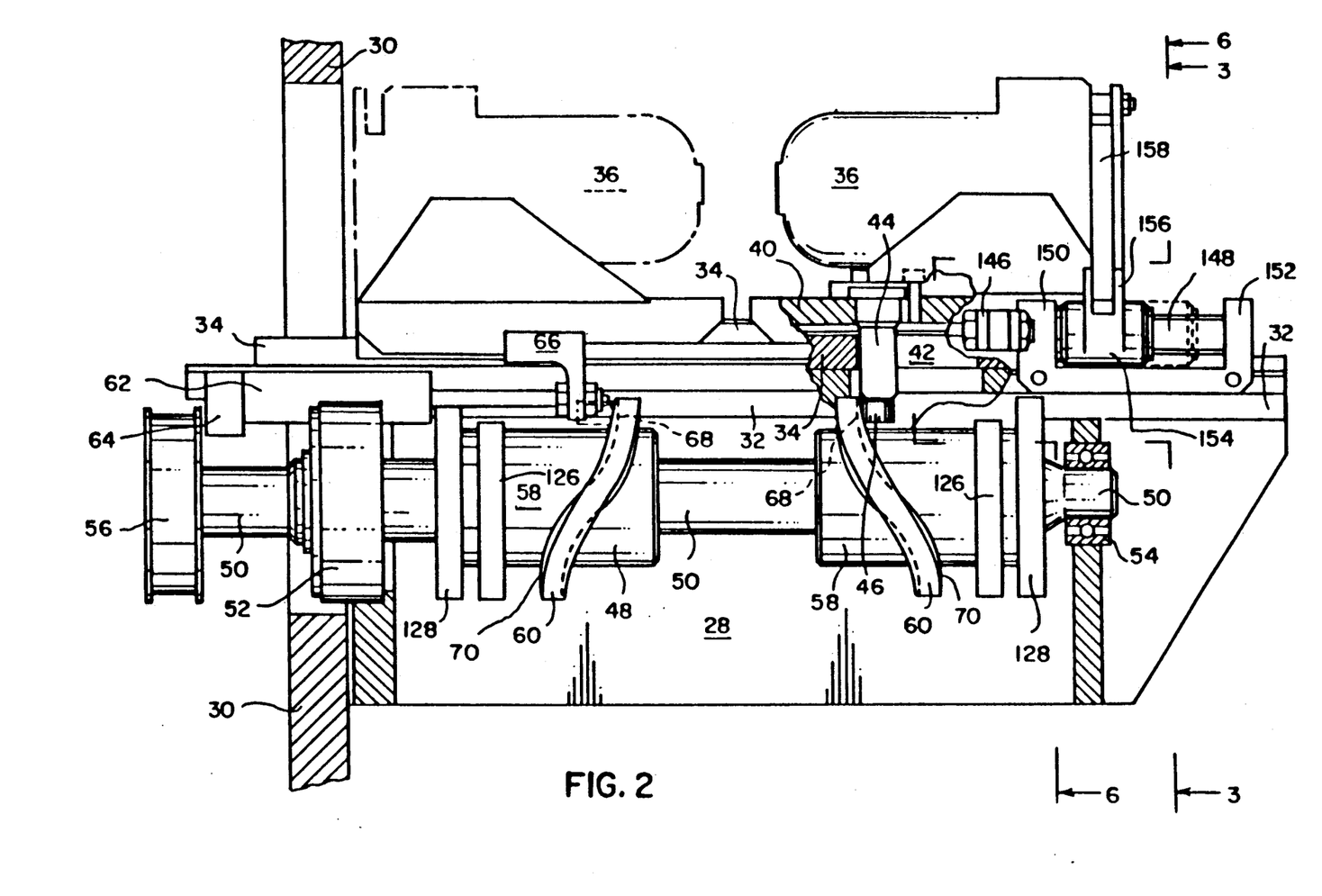
FIG. 2 shows a side elevation view of the mechanism according to the present invention for moving and actuating the staking head for staking the end caps in place on the shell of the magazine.
Figure 3:
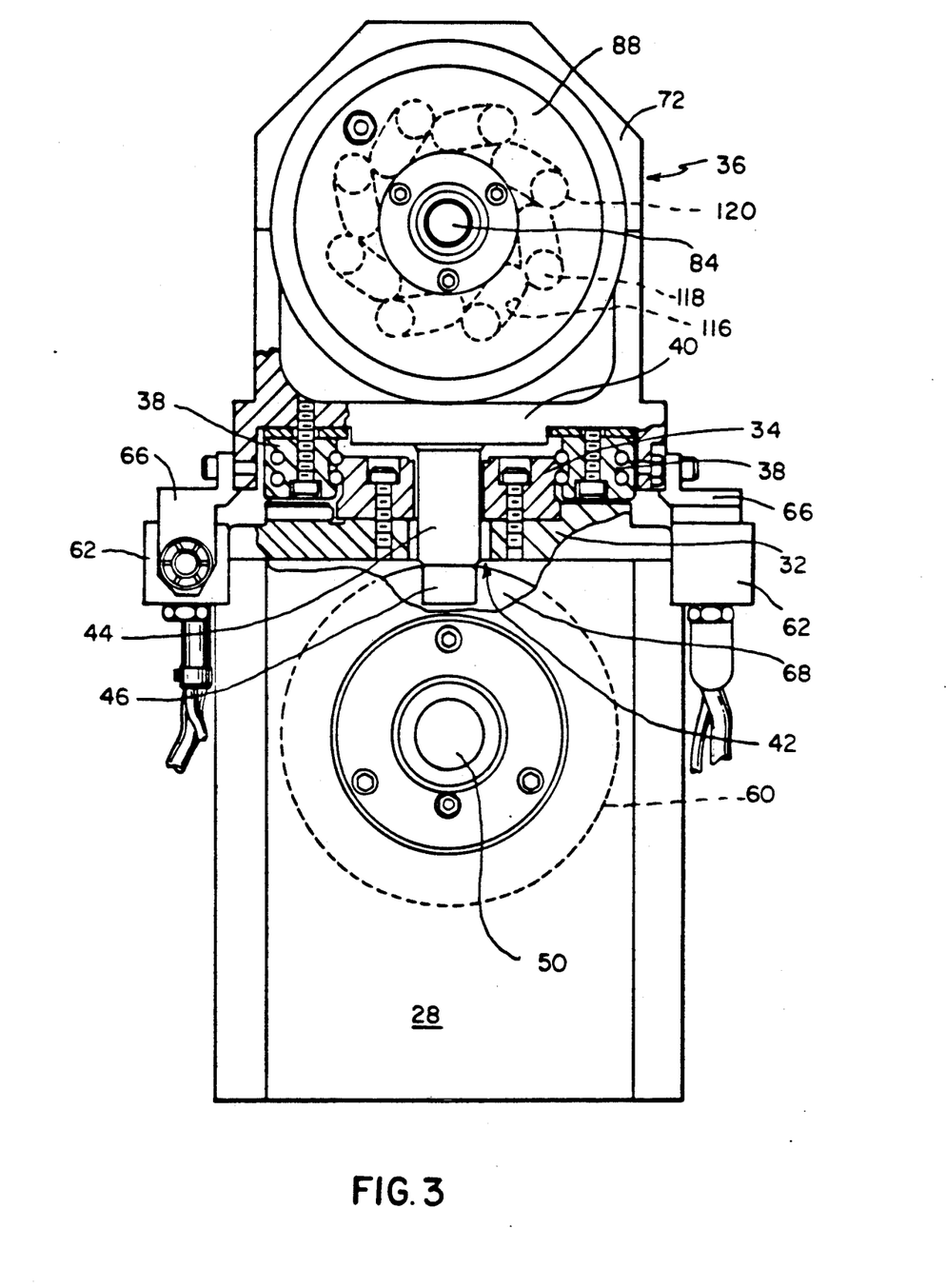
FIG. 3 shows a view taken along line 3—3 of FIG. 2.

FIGS. 2 to 6 illustrate the end cap staking mechanism according to the invention. An outwardly extending box frame 28 is rigidly attached to face plate 30 and comprises an upper plate 32. A slide rail 34 is attached to the upper surface of plate 32 and extends essentially from one end of box frame 28 to the other. A pair of identical end cap stakers 36 are mounted for limited, reciprocating movement along slide rail 34 by pairs of linear bearings 38 which are mounted to the underside of the base plate 40 of stakers 36, as seen in FIG. 3. Beneath each staker 36, slide rail 34 and upper plate 32 are provided with aligned oblong through slots 42, to permit the downward passage of a post 44 attached to base plate 40 as shown in FIGS. 2 and 3. At its lower end, post 44 carries a cam follower roller 46 which engages the drive cam assembly 48 for the staking mechanism.

As shown in FIG. 2, drive cam assembly 48 comprises a shaft 50 rotatably supported at either end by bearings 52,54. A drive pulley 56 is attached to one end of shaft 50, for continuous rotation by a conventional means, not illustrated. Beneath each end cap staker 36, shaft 50 supports a barrel cam 58 having a radially outwardly protruding, circumferentially and axially extending vane 60 one side wall of which is constantly in contact with roller 46 in operation. Roller 46 is maintained in contact with vane 60 by means of a pneumatic cylinder 62 whose head end 64 is attached to frame 28 and whose rod end 66 is attached to and moves with end cap staker 36. Cylinder 62 is continuously pressurized to maintain contact between roller 46 and vane 60 while barrel cam 58 is rotated with shaft 50. As seen in FIG. 2, the two barrel cams are mirror images of one another; so that, rotation of shaft 50 causes the two end cap stakers 36 to move in opposite directions, toward and away from a fixture, shown partially in FIG. 4, which holds a shell 18 with end caps 24 installed and is indexed into and out of position between the two stakers. To achieve this movement, vane 60 extends circumferentially completely around the cam and axially along the cam between diametrically opposed dwell portions 68,70 where the stakers stop briefly at their fully inserted and fully withdrawn positions, respectively. Thus, as vane 60 rotates from the position shown in FIG. 2, it forces roller 46 and staker 36 to move away from the illustrated position against the force of cylinder 62, until dwell portion 70 is reached. Later, when it is necessary to move staker 36 back to the illustrated position, the force of cylinder 62 causes roller 46 to remain in contact with vane 60, causing staker 36 to move in the desired direction until dwell portion 68 is reached.

Figure 4:
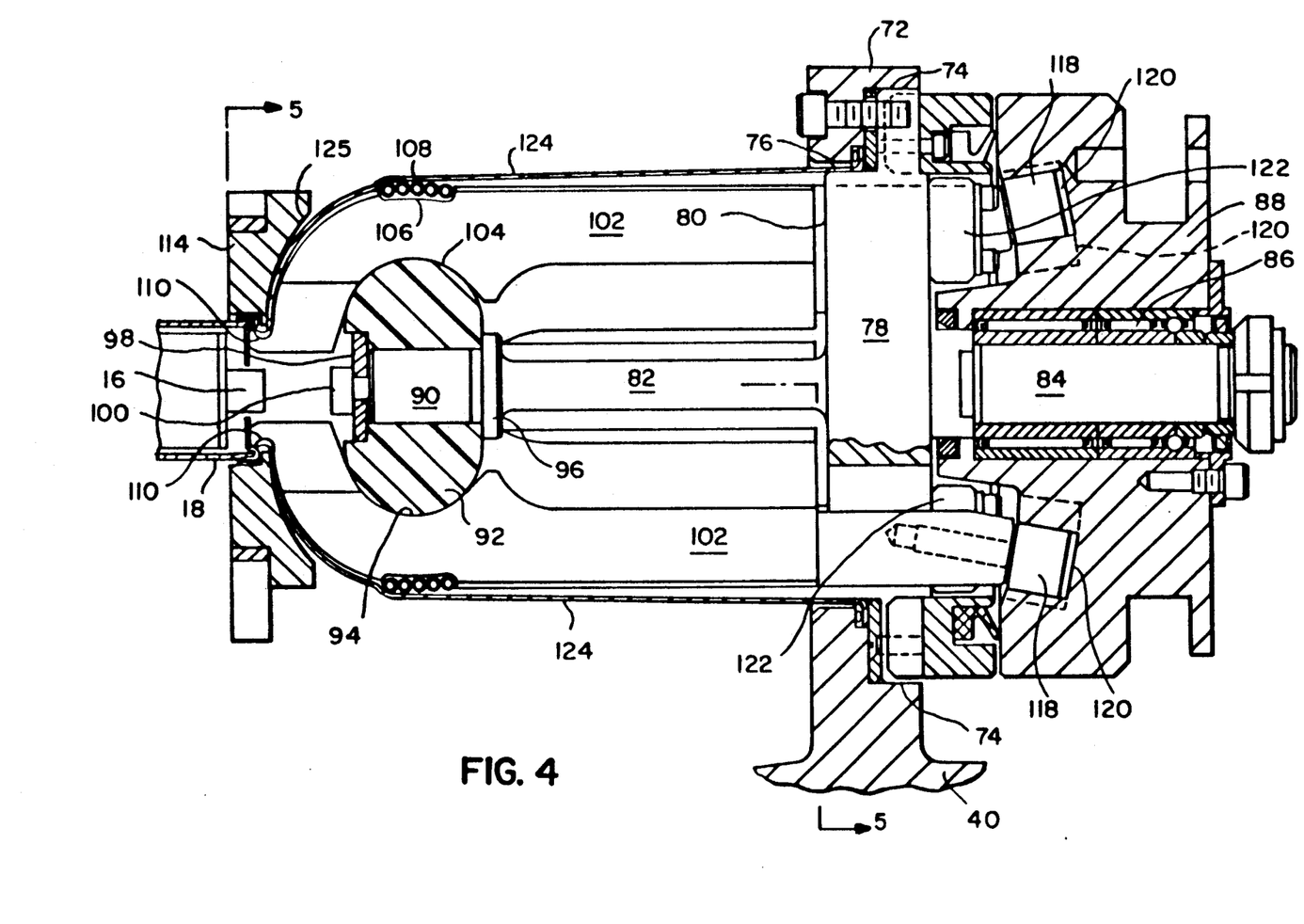
FIG. 4 shows a side elevation view, partially in section, illustrating the interior details of the staking head.
Figures 5, 6:
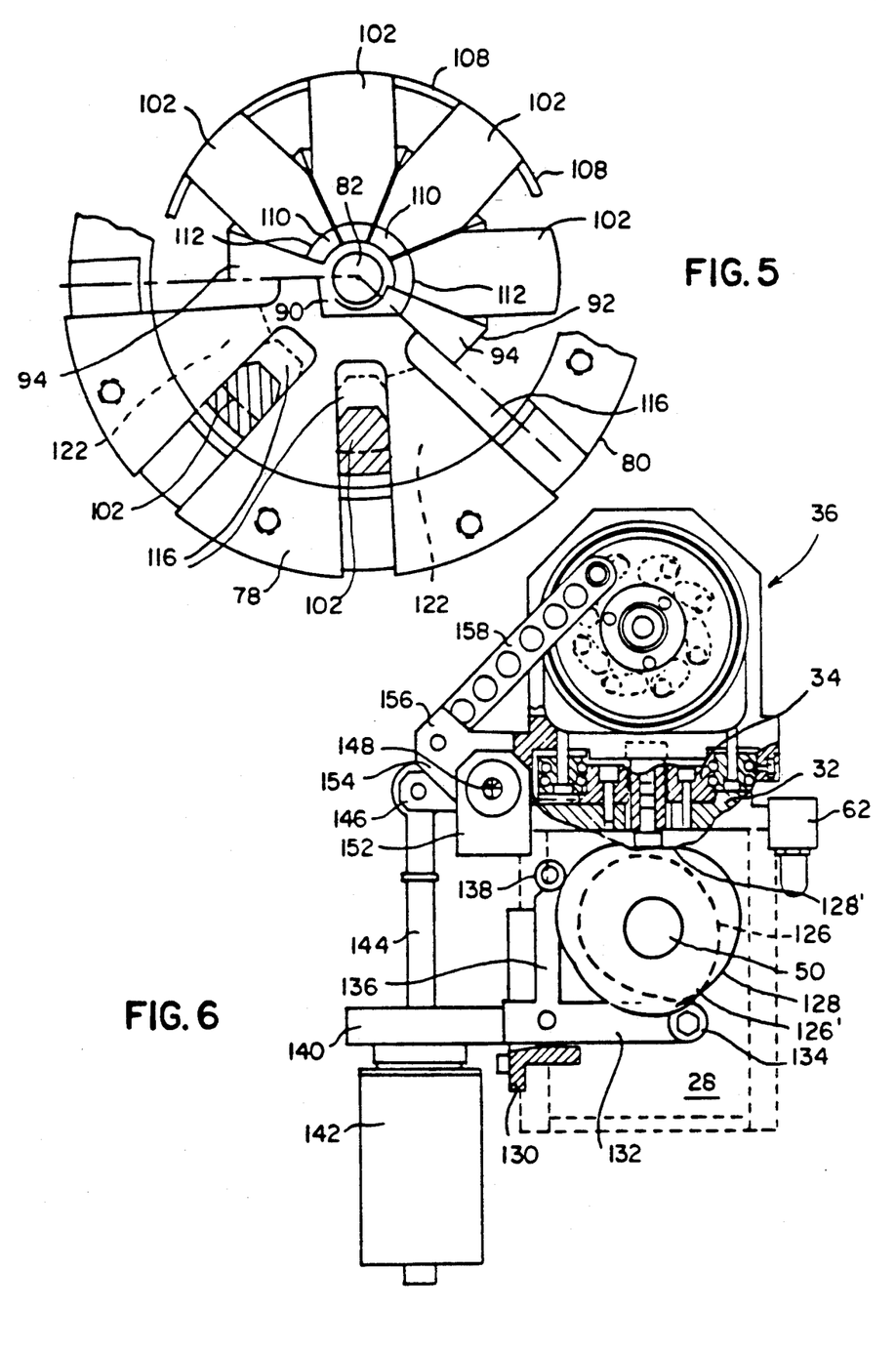
FIG. 5 shows a view taken along line 5—5 of FIG. 4.
FIG. 6 shows a view taken along line 6—6 of FIG. 2.

The details of end cap staker 36 are shown in FIGS. 3 to 6. An upwardly extending mounting flange 72 is attached to base plate 40. In its outboard surface, mounting flange 72 is provided with a counter bore 74 and a through bore 76 within which a support member 78 is mounted by means of a plurality of circumferentially spaced bolts. As seen in FIGS. 4 and 5, support member 78 comprises a central disk 80 formed integrally with a quill shaft 82 extended to the left as illustrated and a stub axle 84 extended to the right. On stub axle 84, a needle bearing assembly 86 rotatably supports a staker cam 88. Quill shaft 82 provides a degree of flexibility and is provided on its free end with a rectangular portion 90. On portion 90 is mounted a pivot ring 92 of somewhat toroidal configuration which, as shown in FIG. 5, comprises a plurality, eight as illustrated, of contiguous, essentially right cylindrical bearing surfaces 94 each of which tapers inwardly toward shaft 82. The axis of each surface 94 is perpendicular to a radius from the center of quill shaft 82. Rectangular portion 90 prevents pivot ring 92 from rotating about quill shaft 82. Pivot ring 92 abuts a flange 96 on quill shaft 82 and is held in place by a washer 98 secured by a bolt 100.

Pivotably mounted on bearing surfaces 94 are a corresponding plurality of elongated staking fingers 102 each having a cylindrical bearing surface 104 which rests on one of bearing surfaces 94. The large bearing area between the staking fingers and the pivot ring reduces load and extends the operating life of the apparatus. The axis of each bearing surface 104 is perpendicular to the long axis of the associated staking finger 102. Each of fingers 102 is provided on its radially outer surface with a circumferentially extending groove 106 and a plurality of garter springs 108 are stretched about the plurality of staking fingers within grooves 106, to hold the staking fingers securely against pivot ring 92. At their ends nearer pivot ring 92, staking fingers 102 are tapered radially inwardly, as seen in FIG. 5, and are provided with outwardly flaring portions or claws 110 having circular outer edges 112 sized to engage the inside diameter of the end flanges 27 on end caps 24 during staking. For ease of illustration in FIG. 4, end cap 24 is shown within fixture 114 which holds one end of a magazine; and it will be understood that end cap 24 by the time it reaches staking mechanisms 36 has been pressed over the cylindrical end edge of magazine shell 18, shown fragmentarily, and that the nearly completed magazine will be held between a pair of such fixtures 114.

On the opposite side of pivot ring 92 from claws 110, staking fingers 102 are elongated considerably to extend through a corresponding plurality of circumferentially spaced, radially inwardly extending slots 116 which pass axially through central disk 80. At their ends farther from pivot ring 92, staking fingers 102 are provided with cam follower rollers 118 which are received in a corresponding plurality of curved cam slots or pockets 120 in the surface of staker cam 88 facing central disk 80, as shown in phantom in FIG. 3 and in full section in FIG. 4. The axis of rotation of each roller 118 extends along the associated staking finger 102 and is perpendicular to the axis of the associated bearing surface 104. Thus, as staker cam 88 is rotated about stub axle 84, rollers 118 ride in cam slots 120 and cause the ends of staking fingers 102 to move radially inwardly during staking of an end cap or radially outwardly following staking. On the side of central disk 80 facing cam slots 120 and between slots 116 are mounted wedge shaped bearing blocks 122 of self lubricating material, which contact and guide the sides of staking fingers 102. To protect the interior of end cap staker 36 from dust and grit, a thin rubber cover 124 is captured at its base between mounting flange 72 and central disk 80 and provided at its other end with a dome shaped portion sized to fit loosely within a concavity 125 provided in fixture 114. As illustrated in FIG. 4, the tips of staking fingers 102 pass through an opening in the dome shaped portion of cover 124.

The mechanism for rotating staker cam 88 is illustrated in FIGS. 2 and 6. At each end, outboard of barrel cams 58, shaft 50 supports a pair of plate cams 126,128. A flange 130 is mounted to frame 28, as shown partially in section in FIG. 6. Pivotably mounted to flange 130 is an L-shaped cam follower having a horizontally extending arm portion 132 with a cam follower roller 134 at its end and an integral, vertically extending arm portion 136 with a cam follower roller 138 at its end. Roller 134 rides on the circumference of cam plate 126 and roller 138, of cam plate 128. The circumferential surfaces of cam plates 126 and 128 are configured so that, when shaft 50 rotates clockwise as seen in FIG. 6, rollers 134 and 136 will remain always in contact with their respective cams and will move synchronously back and forth as the cams rotate. On most of their circumferences, cam plates 126,128 have constant radii so that portions 132,136 remain stationary; however, cam plate 126 is provided with a radially outwardly projecting lobe portion 126' which forces roller 134 outward and then inward, while cam plate 128 is provided with a radially inwardly projecting portion 128' which causes roller 138 to move inward and then outward. As will be apparent from FIG. 6, the combined effect of portions 126' and 128' is to cause the L-shaped cam follower to rotate clockwise and then counterclockwise during a portion of each complete rotation of the cam plates.

Opposite the pivot point from roller 134, the L-shaped cam follower is attached to the main support ring 140 of a gimbal mount attached to the rod end of a load limiting pneumatic cylinder 142, which preferably is of the rolling diaphragm type. In operation, the rod 144 of cylinder 142 is kept fully extended; so that, as cam plates 126,128 cause the L-shaped cam follower to rotate clockwise and then counterclockwise, the assembly of cylinder 142 and rod 144 rises and falls essentially vertically due to the use of the gimbal mount. The upper end of rod 144 is pivotably attached to a crank lever 146 which, as seen in FIG. 2, is fixedly attached to one end of a spline shaft 148 rotatably supported by a pair of spaced brackets 150,152 attached to frame 32. Thus, movement of cylinder 142 and rod 144 causes spline shaft 148 to rotate. Slidably mounted on spline shaft 148 is a spline bearing assembly 154 which can slide along and rotate with spline shaft 148. A crank arm 156 extends radially from the housing of assembly 154 and is pivotably attached at its outer end to one end of a link 158 whose other end is pivotably attached at a peripheral location to staker cam 88. Thus, as cylinder 142 and rod 144 move upward, staker cam 88 is caused to rotate clockwise as viewed in FIG. 3, thereby causing rollers 118 to move radially inward to force the opposite ends of staking fingers 102 radially outward to stake end caps 24 in place.

When fixtures 114 have been positioned between end cap stakers 36, barrel cams 58 have withdrawn end cap stakers 36 and rollers 46 are at dwell portions 70. Continued rotation of barrel cams 58 permits pneumatic cylinders 62 to move each staker toward engagement with the assembled magazine held by fixtures 114 until dwell portion 68 is reached. As end cap stakers 36 move toward engagement, spline bearing assembly 154 slides along spline shaft 148. As outwardly flaring portions 110 move inside flanges 27 of the end caps, rollers 46 enter dwell portions 68, thus stopping the movement of the end cap stakers. Cam plates 126,128 then cause portions 132,136 to rotate clockwise and lift cylinder 142 and rod 144 upward. This causes outwardly flaring portions 110 to move radially outwardly into contact with flanges 27 on end caps 24 to deform them into the shell 18 of the magazine and complete the staking operation. Due to the presence of quill shaft portion 1018, any minor misalignments of the magazine can be accommodated as shaft portion 1018 will flex to permit all of outwardly flaring portions 110 to make good contact with end caps 24 and thus ensure application of evenly distributed staking force. Excess travel of the staking fingers is prevented by the presence of load limiting pneumatic cylinder 142. When the staking fingers have been forced into contact with end caps 24 to a predetermined level of force, further motion will simply cause portions 132,136 to lift the body of cylinder 142 upward along rod 144, thus preventing overstaking or tool damage. When portions 132,136 begin to rotate counterclockwise under the influence of cam plates 126,128, the body of the cylinder is lowered along rod 144 until the rod is again fully extended, after which the assembly of cylinder and rod are lowered as a unit. Once outwardly flaring portions 110 have been withdrawn upon completion of the staking, continued rotation of barrel cams 58 causes end cap stakers 36 to withdraw until dwell portion 70 is reached again, thus completing the staking cycle.

While our invention has been shown and described with reference to particular embodiments thereof, those skilled in the art will understand that various modifications in form and detail of the apparatus and method may be made without departing from the scope and spirit of our invention.

Having thus described our invention is sufficient detail to enable those skilled in the art to make and use it, we claim as new and desire to secure Letters Patent for:

1. Apparatus for staking end caps onto a cylindrical shell having substantially circular end edges, said apparatus comprising:
   a fixture for holding such a shell with such end caps installed over such end edges, said fixture comprising through bores aligned with each of such end caps;
   a frame positioned adjacent to said fixture;
   a slide rail mounted on said frame and extended essentially parallel to the axis of such a shell; and
   a pair of end cap staking mechanisms mounted for reciprocating movement on said slide rail on opposite sides of said fixture, each said staking mechanism comprising:
   a base plate;
   a mounting flange attached to said base plate;
   a quill shaft supported by said mounting flange and extended toward one of said bores in said fixture, said quill shaft having a free end;
   a pivot ring mounted on said free end;
   a plurality of elongated staking fingers pivotably supported between their ends by and arranged around said pivot ring;
   an outwardly flaring portion on the end of each staking finger closer to one of said bores in said fixture, said flaring portion being sized to pass through said one of said bores to engage said end cap;
   a cam follower on the opposite end of each staking finger;
   cam means engaged with said follower on each staking finger;
   means for actuating said cam means to cause said flaring portions to move radially inward and outward; and
   means for causing said staking mechanism to move toward said fixture until said flared portions extend through said bore in said fixture in position to engage said end cap and to move away from said fixture after said end cap has been staked in place on said substantially circular edges.

2. Apparatus according to claim 1, wherein said means for actuating said cam means comprises:
   a spline shaft mounted on said frame essentially parallel to said slide rail;
   a spline bearing assembly mounted for sliding movement along and rotation with said spline shaft;
   a link extending between said spline bearing assembly and said cam means, whereby rotation of said spline shaft causes said cam means to rotate to move said staking fingers; and
   means mounted on said frame for rotating said spline shaft when said flared portions are in position to engage said end cap.

3. Apparatus according to claim 2, wherein said means for rotating said spline shaft comprises:
   a crank lever attached to said spline shaft;
   a pneumatic cylinder assembly having a rod end pivotably attached to said crank lever;
   a gimbal mount supporting the cylinder of said assembly; and
   means, actuated by said means for causing said staking mechanisms to move, for raising and lowering said assembly by said gimbal mount.

4. Apparatus according to claim 3, wherein said cylinder is of the rolling diaphragm type.

5. Apparatus according to claim 3, wherein said means for raising and lowering said assembly comprises:
   a pair of cams mounted for rotation by said means for causing said staking mechanisms to move;
   a cam follower pivotably mounted to said frame, said cam follower comprising a pair of radially extending arm portions, one of said arm portions being operatively associated with one of said pair of cams and the other of said arm portions being operatively associated with the other of said pair of cams and said gimbal mount being attached to said cam follower, whereby rotation of said pair of cams raises and lowers said gimbal mount.

6. Apparatus according to claim 5, wherein each of said arm portions comprises a roller which constantly contacts an operatively associated cam.

7. Apparatus according to claim 1, further comprising means for biasing said staking fingers into contact with said pivot ring.

8. Apparatus for staking an end cap onto a cylindrical shell having a substantially circular end edge, said apparatus comprising:
   a fixture for holding such a shell with such end cap installed over such end edge, said fixture comprising a through bore aligned with such end cap;
   a frame positioned adjacent to said fixture;
   a slide rail mounted on said frame and extended essentially parallel to the axis of such a shell; and
   an end cap staking mechanism mounted for reciprocating movement on said slide, said staking mechanism comprising:
   a base plate;
   a mounting flange attached to said base plate;
   a quill shaft supported by said mounting flange and extended toward said bore in said fixture, said quill shaft having a free end;
   a pivot ring mounted on said free end;

a plurality of elongated staking fingers pivotably supported between their ends by and arranged around said pivot ring;

an outwardly flaring portion on the end of each staking finger closer to said bore in said fixture, said flaring portion being sized to pass through said bore to engage said end cap;

a cam follower on the opposite end of each staking finger;

cam means engaged with said follower on each staking finger;

means for actuating said cam means to cause said flaring portions to move radially inward and outward; and means for causing said staking mechanism to move toward said fixture until said flared portions extend through said bore in said fixture in position to engage said end cap and to move away from said fixture after said end cap has been staked in place on said substantially circular edge.

9. Apparatus according to claim 8, wherein said means for actuating said cam means comprises:

a spline shaft mounted on said frame essentially parallel to said slide rail;

a spline bearing assembly mounted for sliding movement along and rotation with said spline shaft;

a link extending between said spline bearing assembly and said cam means, whereby rotation of said spline shaft causes said cam means to rotate to move said staking fingers; and means mounted on said frame for rotating said spline shaft when said flared portions are in position to engage said end cap.

10. Apparatus according to claim 9, wherein said means for rotating said spline shaft comprises:

a crank lever attached to said spline shaft;

a pneumatic cylinder assembly having a rod end pivotably attached to said crank lever;

a gimbal mount supporting the cylinder of said assembly; and means, actuated by said means for causing said staking mechanism to move, for raising and lowering said assembly by said gimbal amount.

11. Apparatus according to claim 10, wherein said cylinder is of the rolling diaphragm type.

12. Apparatus according to claim 10, wherein said means for raising and lowering said assembly comprises;

a pair of cams mounted for rotation by said means for causing said staking mechanism to move;

a cam follower pivotably mounted to said frame, said cam follower comprising a pair of radially extending arm portions, one of said arm portions being operatively associated with one of said pair of cams and the other of said arm portions being operatively associated with the other of said pair of cams and said gimbal mount being attached to said cam follower, whereby rotation of said pair of cams raises and lowers said gimbal mount.

13. Apparatus according to claim 12, wherein each of said arm portions comprises a roller which constantly contacts an operatively associated cam.

14. Apparatus according to claim 8, further comprising means for biasing said staking fingers into contact with said pivot ring.

* * * * *